Jan. 30, 1962
E. A. RODGERS
3,018,536
HOSIERY SUPPORTER
Filed July 6, 1959
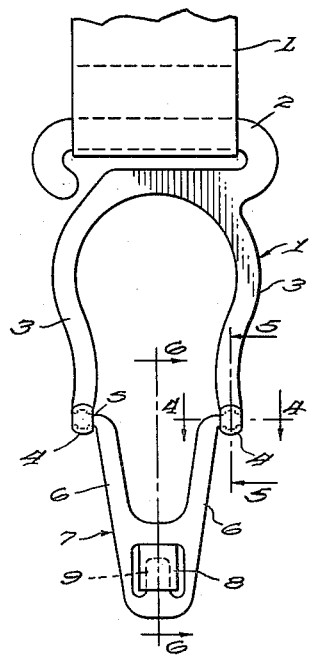
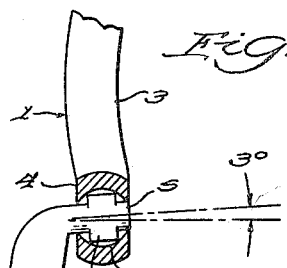
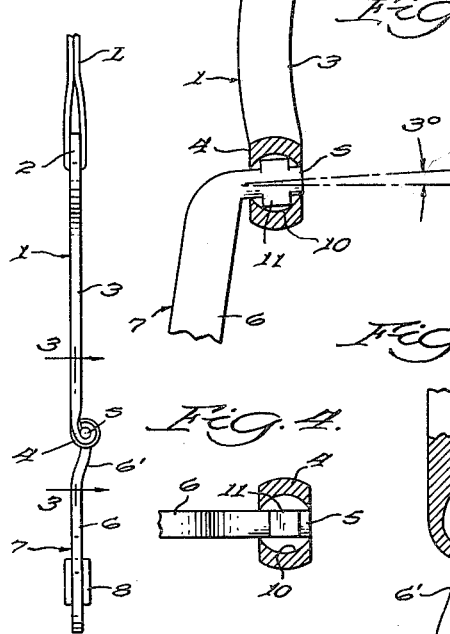
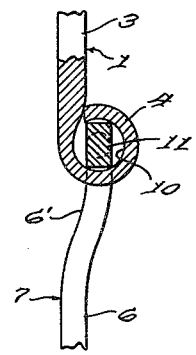
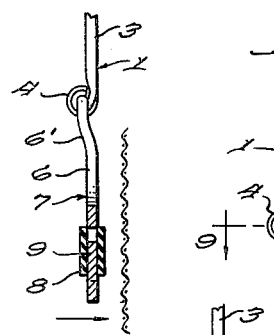
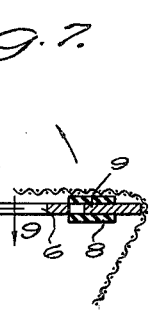
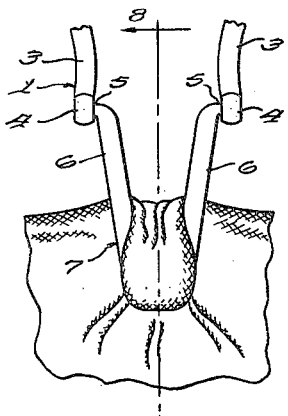
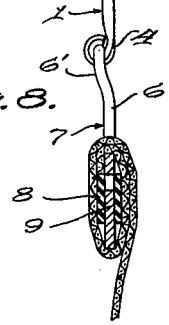
INVENTOR.
Edward A. Rodgers.
BY
Harold J. LeVesconte
Atty.

United States Patent Office 3,018,536
Patented Jan. 30, 1962

3,018,536
HOSIERY SUPPORTER
Edward A. Rodgers, 389 N. Los Robles Drive,
Pasadena, Calif.
Filed July 6, 1959, Ser. No. 825,226
2 Claims. (Cl. 24—243)

This invention relates to hose supporters of the type generally disclosed in Patent No. 1,859,810 dated May 24, 1932 and has for its principal object the provision of means in a supporter of that general character which is effective normally to yieldingly resist any tendency of the rotatable hose engaging component to move to a position out of alignment with the garment engaging component.

Another object of the invention is to provide a hose supporter comprising a pair of yoke-like components constituting a garment engaging component and a hose engaging component and having the ends of said members rotatably interconnected by hinge means formed integrally therewith and so interengaged and formed that the pivotal connection is one which tends always to maintain the components extending in opposite directions from the hinged interconnection thereof.

A further object of the invention is to provide a hose supporter of the above type which is of less thickness than others of the same general character and mode of operation and which, therefore, is less noticeable through clothing such as tightly fitting dresses.

With the foregoing objects in view, together with such other objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a front elevational view of a hose supporter embodying the present invention, FIG. 2 is an edge elevation as viewed from the right hand edge of FIG. 1, FIG. 3 is a greatly enlarged fragmentary, sectional view taken on the line 3—3 of FIG. 2, FIGS. 4 and 5 are, respectively, enlarged, fragmentary, sectional views taken, respectively, on the lines 4—4 and 5—5 of FIG. 1, FIGS. 6, 7, and 8 are sectional views taken on the line 6—6 of FIG. 1 and showing first the initial position of the supporter alongside of the welt of a hose to be supported thereby, then in FIG. 7 the start of the interengaging movement with the hose and, in FIG. 8 the final interengagement of the hose and supporter, FIG. 9 is an enlarged, fragmentary, sectional view taken on the line 9—9 of FIG. 7 and showing particularly the relation of the parts when the hose engaging component is disposed at right angles to the garment engaging component as illustrated in FIG. 7, and FIG. 10 is a front elevational view of the lower end of the garment component and of the hose engaging component as they appear when fully engaged with the hose, it being noted that the arrangement shown in FIG. 8 constitutes a cross section on the line 8—8 of FIG. 10.

Next, referring to the drawings, the illustrated embodiment of the invention comprises a yoke-like garment engaging component 1 preferably stamped from resilient sheet metal and including a horizontally disposed garment engaging hook 2 adapted for detachable engagement with a garment strap loop L. The yoke is formed by depending, integrally formed arms 3, 3 which are bent into looped portions 4, 4 at their ends to form axially aligned journals for the oppositely laterally extending bearing ends 5, 5 at the ends of the arms 6, 6 of the yoke-like hose engaging component 7 which is also stamped from sheet metal.

As shown in FIGS. 2, 5, 6, 7 and 8, the axial line of the loop portions 4, 4 of the arms 3, 3 is laterally offset from the plane of said arms, the direction of such offset being toward the body of the person wearing the garment. The arms 6, 6 of the hose engaging component 7 are correspondingly offset as indicated at 6' in said figures. By this offset, the faces of the components which are contacted by an outer garment are as nearly as possible in a single plane and are thus better concealed beneath a tight fitting outer garment.

In use, the components occupy the position shown in FIGS. 1, 2 and 10 and the hose component at its lower end carries a friction element 8 comprising a short length of rubber tubing fitted over an upwardly projecting tongue 9 formed by a perforation of inverted U-shape in the lower end of the hose engaging component 7. Assuming that the device is attached to a strap of a garter belt or foundation garment, the hose engaging component is laid over the upper edge of the hose welt as indicated in FIG. 6 and then with the hose held against it and particularly the friction element 8 thereof, it is rotated inwardly toward the hose (counterclockwise as viewed in FIG. 7) for a full revolution with resultant wrapping of the hose around the lower end of the yoke as shown in FIGS. 8 and 10.

Generally, the above-described construction of pivotally interconnected yoke-like components is disclosed in prior patents and the present invention is concerned primarily with improvements in the pivotal connection between the two components. Prior to being bent into the looped ends 4, the ends of the arms 3, 3 are both decreased in thickness and provided with short longitudinally extending grooves on the face thereof which will form the inner faces of the loops, said grooves thus forming a somewhat spherical bearing surface 10 as best shown in FIGS. 3, 4 and 9.

The mid portions bearing ends 5, 5 of the hose engaging component 7 are flattened as at 11, 11 to give said portions greater width than thickness as best shown in FIGS. 3, 5 and 9, the dimensions being such that the spherical surface of the bearing loops is engaged by the portions 11, 11 with relatively close fit at all times resisting axial movement therein.

Additionally, the center lines of the bearing ends 5, 5 are each disposed at opposite slight angles (approximately 3°) to the axial line of the looped ends 4, 4 in a plane passing through said axial line and extending parallel to the arms of the garment engaging component 1. Thus, when the hose engaging component is moved out of said plane, this angular position of the bearing ends 5, 5 thereof will cause a twisting movement of the arms 3, 3 (see FIG. 9) providing a yielding resistance to such movement with the resultant tendency of the hose engaging component to maintain its co-planar relation to the garment engaging component.

While in the foregoing specification there has been described a presently preferred embodiment of the invention, such disclosure is to be understood to be by way of example only and it will be understood, further, that the invention includes as well all such changes and modification of parts, and in the construction, combination and arrangement of parts as shall come within the purview of the appended claims.

I claim:

1. In a supporter adapted to support a hose from a body encircling garment, a garment engaging component comprising a yoke-shaped member formed from resilient sheet metal and having, in position of use, means at the upper end thereof affording detachable engagement with a loop on a body encircling garment and a pair of laterally spaced depending arms each terminating in a bearing and said bearings being disposed on a common horizontally axial line disposed substantially in the plane of the face of said member which in use is adjacent to the body of the user, and a hose engaging component rotatable in said bearings incident to engagement and disengagement with the welt of a hose and comprising, in position of use, a sheet metal, yoke-shaped member having a pair of generally vertically extending arms each terminating at its upper end in a laterally extending journal portion, one each of said journal portions being disposed in one each of said bearings, and said vertically extending arms being off-set laterally whereby the major portion of the surface of said hose engaging component is disposed in co-planar relationship with the face of the garment engaging component which is remote from the face thereof adjacent the body of the user whereby said faces present no protuberances observable through overlying garments; said journaled portions of said hose engaging component being each disposed with the axial lines thereof disposed at opposite acute angles relative to the axial line of the bearings engaged thereby and in a plane which is parallel to the planes of the side surfaces of the arms of said garment engaging component whereby movement of said hose engaging component out of said co-planar relationship is yieldingly resisted by the torsion produced in the arms of said garment engaging component by said journal portions and whereby said components are resultantly yieldingly urged by the engagement of said bearings and journals normally to maintain said co-planar relationship; said bearings being generally spherical and said journal portions of said hose engaging component disposed within said bearings being enlarged in one direction to an extent which is larger than the portions thereof entering said bearings with resultant securing of said hose engaging component therein against play endwise of said bearings.

2. In a supporter adapted to support a hose from a body encircling garment, a garment engaging component comprising a yoke-shaped member formed of resilient sheet metal and having, in position of use, means at the upper end thereof affording detachable connection with a loop on a body encircling garment and a pair of laterally spaced depending arms each terminating in a spherical bearing; said bearings being disposed in a common horizontal axial line in a plane which is generally parallel to the plane of a surface of said member, and a hose engaging component rotatable in said bearings incident to engagement and disengagement with the welt of a hose, and comprising, in position of use, a sheet metal yoke-shaped member having a pair of generally vertically extending arms each terminating in an outwardly extending journal portion disposed one each in each of said bearings; the axial lines of said journal portions being disposed in said first mentioned plane and being oppositely inclined with respect to said axial line of said bearings when said components are disposed in a co-planar relationship operative to impart torsional movements to said depending arms by movement of said hose engaging component out of said co-planar relationship and whereby said components are yieldingly urged by said engagement between said bearings and journals to maintain said co-planar relationship in the normal position of use; said journal portions of said hose engaging component which are disposed within said bearings being enlarged in one direction to an extent which is greater than the portions thereof entering said bearings with resultant securing of said hose engaging component against play endwise of said bearings.

References Cited in the file of this patent

UNITED STATES PATENTS

| | | |
|---|---|---|
| 2,056,428 | Jacobs | Oct. 6, 1936 |
| 2,058,644 | Tompkins | Oct. 27, 1936 |
| 2,081,467 | Tompkins | May 25, 1937 |
| 2,082,367 | Tompkins | June 1, 1937 |
| 2,122,141 | Halthous | June 28, 1938 |
| 2,498,154 | Cantello | Feb. 21, 1950 |
| 2,503,167 | Oldak | Apr. 4, 1950 |